(12) United States Patent
Athirathnam

(10) Patent No.: US 9,970,280 B2
(45) Date of Patent: May 15, 2018

(54) SYSTEM AND METHOD FOR COMPRESSING AND CONDITIONING HYDROCARBON GAS

(71) Applicant: GE Oil & Gas Inc., Houston, TX (US)

(72) Inventor: Rajesh Athirathnam, Houston, TX (US)

(73) Assignee: GE Oil & Gas Inc., Houston, TX (US)

( * ) Notice: Subject to any disclaimer, the term of this patent is extended or adjusted under 35 U.S.C. 154(b) by 0 days. days.

(21) Appl. No.: 14/426,495

(22) PCT Filed: Oct. 6, 2014

(86) PCT No.: PCT/US2014/059230
§ 371 (c)(1),
(2) Date: Mar. 6, 2015

(87) PCT Pub. No.: WO2016/057008
PCT Pub. Date: Apr. 14, 2016

(65) Prior Publication Data
US 2017/0254187 A1 Sep. 7, 2017

(51) Int. Cl.
*B01D 53/06* (2006.01)
*C10L 3/10* (2006.01)
(Continued)

(52) U.S. Cl.
CPC ............ *E21B 43/34* (2013.01); *B01D 53/002* (2013.01); *B01D 53/0446* (2013.01);
(Continued)

(58) Field of Classification Search
CPC ... E21B 43/34; B01D 53/002; B01D 53/0446; B01D 53/18; B01D 53/261;
(Continued)

(56) References Cited

U.S. PATENT DOCUMENTS

| | | | |
|---|---|---|---|
| 4,273,514 A | 6/1981 | Shore et al. | |
| 4,490,985 A * | 1/1985 | Wells ................... | B01D 53/263 62/402 |

(Continued)

FOREIGN PATENT DOCUMENTS

| | | |
|---|---|---|
| CA | 2522428 C | 9/2008 |
| WO | 2014031999 | 2/2014 |

OTHER PUBLICATIONS

International Search Report and Written Opinion issued in connection with corresponding PCT Application No. PCT/US2014/059230 dated Jul. 6, 2015.

*Primary Examiner* — Frank Lawrence
(74) *Attorney, Agent, or Firm* — GE Global Patent Operation

(57) ABSTRACT

A system and method captures and processes flare gas so that the gas is usable as compressed natural gas ("CNG"). The flare gas is pressurized by a combination of a booster compressor and a CNG compressor. While interstage and between the booster compressor and the CNG compressor, the gas is treated to remove moisture and to separate out higher molecular weight hydrocarbons. The moisture is removed by contacting the interstage gas with a hygroscopic agent within a dehydration unit. The moisture free hydrocarbon fluid is expanded, and/or externally cooled and directed to a knock out drum. Higher molecular weight hydrocarbons are separated from the fluid in the knock out drum. Gas from the knock out drum is compressed in the CNG compressor.

16 Claims, 1 Drawing Sheet

(51) Int. Cl.
*E21B 43/34* (2006.01)
*B01D 53/26* (2006.01)
*B01D 53/00* (2006.01)
*B01D 53/04* (2006.01)
*B01D 53/18* (2006.01)

(52) U.S. Cl.
CPC .......... *B01D 53/18* (2013.01); *B01D 53/261* (2013.01); *B01D 53/263* (2013.01); *C10L 3/101* (2013.01); *C10L 3/106* (2013.01); *B01D 2252/2023* (2013.01); *B01D 2253/116* (2013.01); *B01D 2257/80* (2013.01); *C10L 2290/542* (2013.01)

(58) Field of Classification Search
CPC .......... B01D 53/263; B01D 2252/2023; B01D 2253/116; B01D 2257/80; C10L 3/101; C10L 3/103; C10L 2290/542
USPC ..... 95/117, 231, 266; 96/193, 201; 585/820, 585/833
See application file for complete search history.

(56) References Cited

U.S. PATENT DOCUMENTS

| | | |
|---|---|---|
| 6,183,211 B1 | 2/2001 | Wood |
| 6,955,705 B1* | 10/2005 | Cheney ................ B01D 53/263 418/201.1 |
| 2007/0125537 A1 | 6/2007 | Lokhandwala et al. |
| 2008/0113523 A1 | 5/2008 | Owen et al. |
| 2008/0135238 A1 | 6/2008 | Cugnet et al. |
| 2008/0190025 A1* | 8/2008 | Stinson ................ B01D 53/002 48/127.3 |
| 2010/0048963 A1 | 2/2010 | Jones et al. |
| 2011/0247489 A1* | 10/2011 | Witherspoon ....... B01D 53/263 95/18 |
| 2011/0277497 A1 | 11/2011 | Lee et al. |
| 2012/0222552 A1* | 9/2012 | Ravikovitch ...... B01D 53/0438 95/97 |
| 2013/0312870 A1 | 11/2013 | Evans et al. |
| 2014/0260966 A1 | 9/2014 | Dillon et al. |
| 2015/0128802 A1* | 5/2015 | Moneyhun ............ C10L 3/106 95/161 |

* cited by examiner

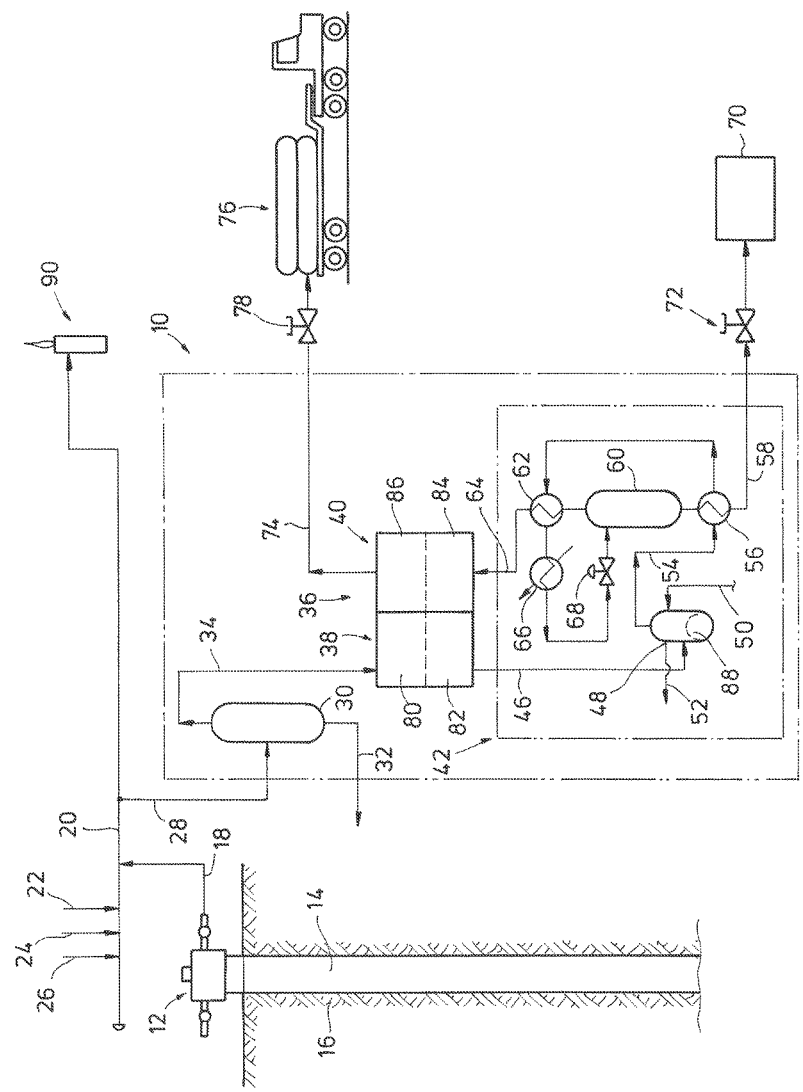

SYSTEM AND METHOD FOR COMPRESSING AND CONDITIONING HYDROCARBON GAS

BACKGROUND OF THE INVENTION

Field of the Invention

The present disclosure relates in general to a system and method for compressing gas from a hydrocarbon producing well, where the gas is compressed in multiple stages, and conditioned between stages.

Description of the Prior Art

Hydrocarbons produced from subterranean formations are often multiphase fluid mixtures of gases and liquids. The liquids from these multiphase mixtures are usually collected and transported to processing facilities for further refinement. However, as it is not always economical to store or transmit the produced gases, they are sometimes sent directly to flare instead of being captured. When the gases are captured they are often processed to remove moisture and other undesirable compounds. Hydrate inhibitors, such as methanol, are occasionally used to prevent hydrate formation within the gas. However, the hydrate inhibitors can be difficult to separate from the gas and thus introduce added complexities when trying to obtain a marketable gas product.

SUMMARY OF THE INVENTION

Described herein is an example method of producing compressed natural gas which includes obtaining fluid from a wellbore; where the fluid contains liquid and gas, and also includes a mixture of higher molecular weight hydrocarbons and lower molecular weight hydrocarbons. The gas from the wellbore is pressurized to an interstage pressure, and moisture is removed from the gas while the gas is at the interstage pressure to form a dry gas. Higher molecular weight hydrocarbons are removed from the gas while the gas is at the interstage pressure to isolate natural gas, and the processed natural gas is pressurized to form compressed natural gas. Removing moisture from the gas can involve contacting the gas with a hygroscopic agent that couples with the moisture, and separating the moisture and hygroscopic agent from the gas. The step of separating the higher molecular weight hydrocarbons from the gas can include cooling the gas, flashing the gas across a flow restriction so that the higher molecular weight hydrocarbons condense to from a liquid, and separating the liquid from the gas. In this example, during the step of cooling heat from the liquid is transferred to the gas. Alternatively, the step of cooling includes directing the gas through a chiller. The liquid can be transferred to an offsite location that is remote from the wellbore. The step of removing moisture from the gas can include contacting the gas with a molecular sieve. The compressed natural gas can be transferred to a container, where the container is transported to a location remote from the wellbore. The steps of pressurizing the gas can take place proximate the wellbore. Moisture can be removed from the gas prior to the step of pressurizing the gas to the interstage pressure.

Another example method of producing compressed natural gas involves receiving an amount of gas directly from a wellbore, pressurizing the gas to an interstage pressure, dehumidifying the gas at the interstage pressure to form a dry gas, and compressing the dry gas to form compressed natural gas. The dry gas can include a mixture of higher molecular weight hydrocarbons and lower molecular weight hydrocarbons, the method may further involve separating the higher molecular weight hydrocarbons from the dry gas at the interstage pressure. In this example, the step of separating the higher molecular weight hydrocarbons includes cooling the dry gas with a lower temperature fluid selected from the group consisting of liquid comprising the higher molecular weight hydrocarbons, a chilled fluid, and combinations thereof. The step of dehumidifying the gas at the interstage pressure may include contacting the gas with a hygroscopic agent.

Also disclosed herein is an example of a system for producing compressed natural gas which is made up an interstage conditioning system with a dehumidifying system for removing moisture from gas from a wellbore, a booster compressor having a suction line in communication with the gas from the wellbore and a discharge line in communication with the interstage conditioning system, and a compressor having a suction line in communication with an exit of the dehumidifying system and a discharge line having compressed natural gas. The system can also have a separation tank in the interstage conditioning system for separating higher molecular weight hydrocarbons from the gas. The dehumidifying system optionally has a tank with an injection system for a hygroscopic agent. The dehumidifying system optionally includes a tank having a molecular sieve.

BRIEF DESCRIPTION OF THE DRAWINGS

Some of the features and benefits of the present invention having been stated, others will become apparent as the description proceeds when taken in conjunction with the accompanying drawings, in which:

FIG. 1 is a schematic view of an example of a system for processing fluid from a wellbore.

While the invention will be described in connection with embodiments, it will be understood that it is not intended to limit the invention to the embodiments. On the contrary, it is intended to cover all alternatives, modifications, and equivalents, as may be included within the spirit and scope of the invention as defined by the appended claims.

DETAILED DESCRIPTION OF THE INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

An example of a compressed natural gas (CNG) system 10 is schematically illustrated in FIG. 1. The CNG system 10 is downstream of a wellhead assembly 12 shown mounted over a wellbore 14 that intersects a formation 16. Hydrocarbons, both liquid and gas, from the wellbore 14 are produced through the wellhead assembly 12 and transmitted from wellhead assembly 12 via a connected production line 18. Production line 18 terminates in a header 20. The header 20 may optionally be the destination for other production lines 22, 24, 26 that also transmit production fluid from other wellhead assemblies (not shown). A feed line 28 provides a communication means between the header 20 and CNG system 10. The end of feed line 28 distal from header 20 terminates in a knockout drum 30 and which optionally provides a way of separating water and other liquids from the feedline 28. A drain line 32 connects to a bottom of knockout drum 30 and directs liquids separated out from the fluid flow in feed line 28. The gas portion of the fluid in feed line 28 directed into knockout drum 30 exits knockout drum 30 through an overhead line 34 shown extending from an upper end of knockout drum 30. The end of overhead line 34 distal from knockout drum 30 connects to a suction line of a compressor 36. In the example of FIG. 1, compressor 36 includes a booster compressor 38 and a CNG compressor 40. In this example, overhead line 34 terminates at a suction end of booster compressor 38 so that the gas in line 34 can be pressurized to an interstage pressure.

The interstage gas discharged from booster compressor 38 is treated in an interstage conditioning system 42. More specifically, a discharge line 46 provides communication between a discharge side of booster compressor 38 to a dehydration unit 48. In one alternative, an injection line 50 for injecting hygroscopic agent into the intermediate stage gas flow stream is shown connected to dehydration unit 48. In one example the hygroscopic agent includes triethylene glycol (TEG), and extracts moisture contained within the interstage gas. A discharge line 52 is shown connected to dehydration unit 48, and provides a means for moisture removal from the intermediate stage gas. Overhead line 54 is shown connected to an upper end of unit 48 and which is directed to a heat exchanger 56. Within heat exchanger 56, fluid from within overhead line is in thermal communication with fluid flowing through a bottoms line 58; where bottoms line 58 connects to a lower end of natural gas liquid (NGL) tank 60. Downstream of heat exchanger 56, overhead line 54 connects to a heat exchanger 62. Flowing through another side of heat exchanger 62 is fluid from an overhead line 64, where as shown overhead line 64 attaches to an upper end of NGL tank 60. An optional chiller 66 is shown downstream of heat exchanger 62 in line with overhead line 54. Further in the example of FIG. 1 is a control valve 68 illustrated in overhead line 54 and just upstream of where line 54 intersects with NGL tank 60. Liquid within line 58 is transmitted to offsite 70, and is controlled to offsite 70 via a valve 72 also shown set within line 58. Valve 72 can be motor or manually operated.

Overhead line 64 is shown connected to a suction end of CNG compressor 40 and where the gas within overhead line 64 is compressed to a CNG pressure. A discharge line 74 connects to a discharge side of CNG compressor 40 and provides a conveyance means for directing the compressed natural gas from CNG compressor 40 to a tube trailer 76. Optionally, a valve 78 is provided in discharge line 74 and for regulating flow through discharge line 74, and to selectively fill tube trailer 76. Alternatively, each booster compressor 38 may include a first stage 80 and second stage 82. In this example, discharge from first stage 80 flows through suction of second stage 82 for additional pressurization. Similarly, CNG compressor 40 contains a first stage 84 and second stage 86, wherein gas within first stage 84 is transmitted to a suction side of second stage 86 for additional compression. Examples exist wherein the booster compressor 38 and CNG compressor 40 are reciprocating compressors and wherein each have a number of throws, wherein some of these throws may be what is commonly referred to as tandem throws.

In one example of operation, a multiphase fluid from well 14 flows through lines 18, 20, 28 and is directed to knockout drum 30. Embodiments exist where the fluid flowing through these lines contains at least an amount of flare gas, which might commonly be sent to a flare and combusted onsite. An advantage of the present disclosure is the ability to economically and efficiently produce an amount of compressed natural gas that may be captured and ultimately marketed for sale. Liquid within the fluid in line 28 out flows to a bottom portion of knockout drum 30 and is separated from gas within the fluid. From within drum 30, the gas is directed into overhead line 34. Line 34 delivers the gas to the suction of booster compressor 38, where in one example the gas is pressurized from an expected pressure between 50 to 100 psig to a pressure of 400 psig, and which forms the interstage gas. Gas, which may include hydrocarbons, is directed through line 46 into dehydration unit 48. For the purposes of discussion herein, lower molecular weight hydrocarbons are referred to those having up to two carbon atoms, wherein higher molecular weight hydrocarbons include those having three or more carbon atoms. To remove moisture from within the interstage gas in line 46, hygroscopic agent is directed from injection line 50 into dehydration unit 48 and allowed to contact the gas within dehydration unit 48. Alternatively, a molecular sieve 88 may be provided within dehydration unit 48. Hygroscopic agent, or sieve 88, can then absorb moisture within the interstage gas. Sieve 88 may be regenerated after a period of time (by pressure swing adsorption or temperature swing adsorption) to remove the moisture captured within spatial interstices in the sieve 88.

To remove higher molecular weight hydrocarbons from the interstage gaseous mixture in line 54, the fluid making up the mixture is cooled within exchangers 56 and 62 and flashed across valve 68. Cooling the fluid stream, and then lowering the pressure across valve 68, is an example of a Joule-Thompson method of separation and can condense higher molecular weight hydrocarbons out of solution and into tank 60. The resulting condensate can be gravity fed from within tank 60 and to offsite 70. An optional flare 90 is schematically illustrated in communication with fluid from the wellbore 14 via an end of header 20. Fluid in header 20 can be routed to flare 90 when system 10 is being maintained or otherwise out of service.

In alternatives employing the optional chiller 66, the higher molecular weight hydrocarbons are separated from the fluid stream by a mechanical refrigeration unit instead of the Joule-Thompson method of gas conditioning. In examples where the Joule-Thompson method is employed, the discharge from the booster compressor 38 can be at about 1,000 psig. In examples using the mechanical refrigeration method, the discharge from the booster compressor 38 can be at a pressure of around 400 psig. An advantage of treating the gas at the interstage pressure is the ability to remove additional moisture from the gas as well as to optimize the separation of the higher molecular weight hydrocarbons. As such, a higher quality of compressed natural gas can be obtained and delivered via line 74 into the tube trailer 76. Moreover, a higher quality of NGL can be delivered to offsite 70. In currently known processes, methanol is sometimes added to the gas mixture to prevent the formation of hydrates during the gas treatment process. However, the addition of methanol is not only costly, but also reduces the quality and marketability of the end products.

The present invention described herein, therefore, is well adapted to carry out the objects and attain the ends and advantages mentioned, as well as others inherent therein. While embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of producing compressed natural gas, the method comprising:
    obtaining from a wellbore a gas that comprises higher molecular weight hydrocarbons and lower molecular weight hydrocarbons;
    pressurizing the gas from the wellbore to an interstage pressure;
    removing moisture from the gas while the gas is at the interstage pressure to form a dry gas;
    separating the higher molecular weight hydrocarbons from the gas while the gas is at the interstage pressure to form natural gas; and
    pressurizing the natural gas to form compressed natural gas.

2. The method of claim 1, wherein the step of removing moisture from the gas comprises contacting the gas with a hygroscopic agent that couples with the moisture, and separating the moisture and hygroscopic agent from the gas.

3. The method of claim 1, wherein the step of separating the higher molecular weight hydrocarbons from the gas comprises cooling the gas, flashing the gas across a flow restriction so that the higher molecular weight hydrocarbons condense to from a liquid, and separating the liquid from the gas.

4. The method of claim 3, wherein the step of cooling comprises transferring heat from the liquid to the gas.

5. The method of claim 3, wherein the step of cooling comprises directing the gas through a chiller.

6. The method of claim 3, further comprising directing the liquid to an offsite location that is remote from the wellbore.

7. The method of claim 1, wherein the step of removing moisture from the gas comprises contacting the gas with a desiccant material.

8. The method of claim 1, further comprising directing the compressed natural gas to a container, and transporting the container to a location remote from the wellbore.

9. The method of claim 1, wherein the steps of pressurizing the gas take place proximate the wellbore.

10. The method of claim 1, further comprising removing moisture from the gas prior to the step of pressurizing the gas to the interstage pressure.

11. A method of producing compressed natural gas, the method comprising:
    receiving an amount of gas directly from a wellbore;
    pressurizing the gas to an interstage pressure;
    dehumidifying the gas at the interstage pressure to form a dry gas, wherein the dry gas comprises a mixture of higher molecular weight hydrocarbons and lower molecular weight hydrocarbons;
    separating the higher molecular weight hydrocarbons from the dry gas at the interstage pressure; and
    compressing the dry gas to form compressed natural gas.

12. The method of claim 11, wherein the step of separating the higher molecular weight hydrocarbons comprises cooling the dry gas with a lower temperature fluid selected from the group consisting of liquid comprising the higher molecular weight hydrocarbons, a chilled fluid, and combinations thereof.

13. The method of claim 11, wherein the step of dehumidifying the gas at the interstage pressure comprises contacting the gas with a hygroscopic agent.

14. A system for producing compressed natural gas, the system comprising:
    an interstage conditioning system comprising a dehumidifying system for removing moisture from gas from a wellbore and a separation tank for separating higher molecular weight hydrocarbons from the gas;
    a booster compressor having a suction line in communication with the gas from the wellbore and a discharge line in communication with the interstage conditioning system; and
    a compressor having a suction line in communication with an exit of the dehumidifying system and a discharge line having compressed natural gas.

15. The system of claim 14, wherein the dehumidifying system comprises a tank having an injection system for a hygroscopic agent.

16. The system of claim 14, wherein the dehumidifying system comprises a tank having a desiccant material.

* * * * *